July 16, 1940.　　　J. H. ROONEY ET AL　　　2,207,822
APPARATUS AND PROCESS FOR MAKING DECORATIVE FILMS
Filed June 4, 1937
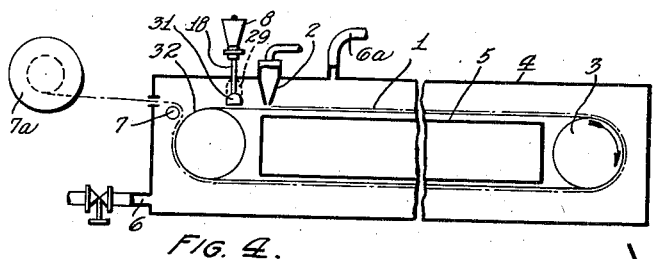
FIG. 2.
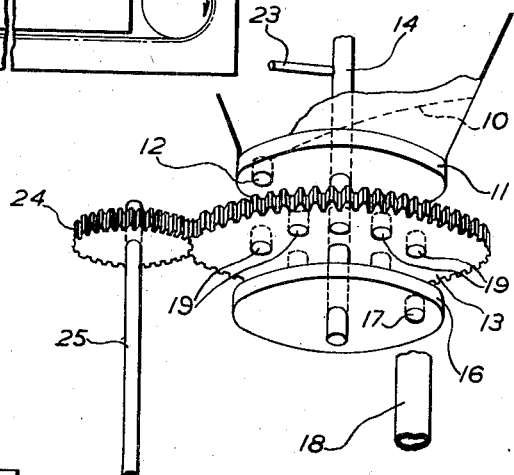
FIG. 1
FIG. 3
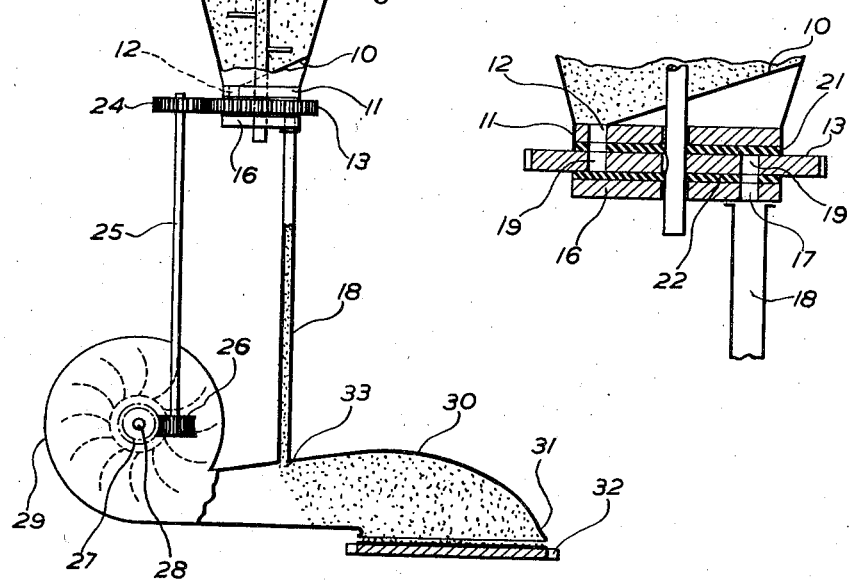
JAMES H. ROONEY
PHILIP R. HAWTIN
INVENTORS
ATTORNEYS Patented July 16, 1940

2,207,822

UNITED STATES PATENT OFFICE 2,207,822

APPARATUS AND PROCESS FOR MAKING DECORATIVE FILMS

James Henry Rooney and Philip Richard Hawtin, Spondon, near Derby, England, assignors to Celanese Corporation of America, a corporation of Delaware Application June 4, 1937, Serial No. 146,377
In Great Britain June 12, 1936

10 Claims. (Cl. 18—15)

This invention relates to the manufacture of products, for example, artificial ribbons, films, foils, sheets and coated articles made of or containing cellulose acetate or other base material which is capable of forming filaments, films or coatings and of dissolving in volatile solvents.

According to the invention fancy films, foils, coatings and like products are made by a process which comprises forming the product on a suitable surface by the evaporative method and during the evaporation of the volatile solvent from the shaped composition causing the formation of numerous small bubbles in said composition with the aid of a powder adapted to form nuclei for said bubbles and previously applied to said surface. We have found that bubbles can be formed within the products by various other methods, but that these have disadvantages from which the method of the invention is free. Thus, for example, bubble formation may be effected by aerating the film-forming solution. It is, however, very difficult in this way to effect uniform aeration with bubbles of the desired size. Bubble formation can also be brought about by heating the supporting surface. Great difficulty, however, is experienced in applying this method so as to produce bubbles of the desired size without causing frothing of the solution. The use of the finely divided material avoids these difficulties and enables the size and distribution of the bubbles to be controlled with ease.

The invention includes forming films, foils and coatings on a stationary surface sprinkled with the powder by flowing a solution of a film-forming base in a volatile solvent on to said surface and effecting evaporation of the volatile solvent, the product being subsequently stripped from the surface if desired. The most important application of the invention, however, is in the manufacture of films and foils, particularly foils for use as wrapping paper by the method in which a solution of the film-forming base, e. g., cellulose acetate in a volatile solvent is extruded on to a surface travelling along a closed path through a heated atmosphere. In applying the invention to this method of film or foil manufacture, the powder is supplied to the travelling surface at a point earlier in its travel than the extrusion point. The film or foil-forming apparatus is preferably of the kind comprising an endless band which may be made of nickel, stainless steel or other suitable material, means for extruding the film-forming composition on to said band at one point in its travel, means for heating the air along a part of the path of the band beyond the extrusion point, and means for stripping the substantially dried product from the band. In accordance with the invention such film-forming apparatus is provided with means for supplying the powder to the band at an earlier point in its travel than the extrusion point. The powder-supplying means may conveniently comprise a fan or blower having an outlet duct terminating in a cowl extending across the film-forming band, a container for the powder and means adapted to be driven from the drive for the fan or blower for delivering measured quantities of the powder from the container to said outlet duct so that the powder is carried by the air stream from the fan or blower on to the film-supporting surface.

The accompanying drawing shows by way of example a film-forming apparatus provided with means for supplying a powder to the film-forming band according to the invention.

Fig. 1 shows diagrammatically the complete assembly of the powder-supplying means;

Fig. 2 is a detailed view of the lower part of the hopper and the measuring device forming part of said means;

Fig. 3 is a sectional elevation through the lower part of the hopper and the measuring device; and Fig. 4 shows diagrammatically the complete film-forming apparatus provided with powder distributing means.

A layer 1 of film-forming dope containing a volatile solvent is flowed from the casting box 2 on to the film-forming band 32 which is driven by the drum 3 in the direction of the arrow. Air is drawn into the casing 4 enclosing the film-casting band, through the inlet 6 and is drawn off, charged with the vapors of the volatile solvent through the outlet 6a whence it passes to a solvent recovery apparatus not shown. The layer of dope 1 is set to form the desired foil during its travel on the band from the film-casting box 2 to the stripping roller 7 whence it passes to the spool 7a on which it is collected.

Powder is supplied from the hopper 8 to the band 32 at a point just behind the film-casting box 2 and during the evaporation of the volatile solvent from the layer of dope 1 the grains of powder provide nuclei for bubble formation.

The hopper 8 containing the powder 9 has a fixed bottom plate 11 provided with an orifice 12, and a false bottom 10 inclined so as to direct the powder to the orifice 12. A toothed disc 13 is keyed to a driven shaft 14 journalled in a bearing 15 at its upper end and at its lower end in the plate 11 and in a lower fixed plate 16 which is provided with an orifice 17 similar to the orifice 12 and at the same distance from, but on the opposite side of, the axis of the shaft 14, and communicating with the outlet pipe 18. The toothed disc 13 is provided with a number of cellars 19 each in turn adapted, as the disc rotates, to register first with the orifice 12 in the bottom plate 11 and then with the orifice 17 in the lower plate 16, so conveying a measured quantity of powder from the hopper 8 to the outlet 18. Felt discs 21 and 22 prevent leakage between the plates 11 and 16 and the toothed disc 13. The shaft 14 is provided with paddles 23. The toothed disc 13 is driven by means of a spur wheel 24 on a shaft 25 through a worm wheel 26 on said shaft meshing with a driving worm 27.

The worm 27 is fixed on the shaft 28 of a fan 29 having a central air inlet not shown and an air outlet duct 30 terminating in a cowl 31 extending over the whole width of, and slightly above the upper surface of, the film-forming band 32 immediately behind the die (not shown) from which the shaped film-forming composition is extruded on to the band. The outlet pipe 18 from the powder measuring device enters the outlet duct of the fan at 33. Thus measured quantities of powder are supplied at a regular rate from the hopper 8 to the outlet duct 30 of the fan 29 and blown on to the upper surface of the film-forming band 32. For simplicity Fig. 1 shows the spur wheel 24 connected directly to the worm wheel 27 by means of the shaft 25. Actually, however, to obtain the reduction in speed which is necessary between the fan shaft 28 and the shaft 14 it is of advantage to interpose reduction gear between the worm wheel 26 and the spur wheel 24.

Whether the products are formed on a stationary surface or on a moving surface the temperature of the film-forming composition on the supporting surface must be sufficiently high for bubble formation to occur in the presence of the powder. To ensure a sufficiently high temperature the supporting surface may be heated. The temperature necessary will, of course, depend on the volatility of the solvent and on the pressure of the atmosphere into which evaporation occurs.

For the powder, a large variety of substances is available, for example cellulose derivatives, natural and synthetic resins and organic substances of high melting point generally. It is preferable that the finely divided substance should be compatible with the film-forming base, i. e., capable of being absorbed thereby to form a homogeneous mass. Substances which are porous and contain air are particularly suitable. In connection with compositions containing cellulose acetate, special mention may be made of powders comprising cellulose acetate itself and like organic derivatives of cellulose, for example cellulose formate, propionate and butyrate, ethyl, methyl and benzyl celluloses, ethyl cellulose acetate and oxyethyl cellulose acetate. Natural resins, preferably of the soft type, for example rosin, elemi, mastic and accaroid resins and synthetic resins can also be used. Among synthetic resins mention may be made of these formed by the action of formaldehyde on urea, phenol, diphenylol propane and the crude reaction products of phenol and acetone, the condensation products of furfural or other aldehydes with other condensation products of ketones and phenols, including the condensation products of phenols with the ketones of the cyclo-paraffin series, for example cyclo-hexanone, cyclo-pentanone and the like, the resins obtained by the condensation of glycerine and other polyhydric alcohols or derivatives thereof with phthalic acid, phthalic anhydride or other polybasic acids or anhydrides.

The following examples illustrate the invention.

Example 1

Cellulose acetate foil is produced from a solution of cellulose acetate in acetone using film-forming apparatus of the endless band kind provided with powder-supplying means as illustrated in the drawing. The powder with which the hopper 8 is supplied is of acetone-soluble cellulose acetate, ground so as to pass through a gauze of 30 meshes per linear inch and to be retained on a gauze of 60 meshes per linear inch. The measuring device is driven at such a rate that each square foot of the film-forming band is supplied with about 0.01 gram of the powder. The temperature of the drying cabinet (not shown in the drawing) through which the band passes and in which the bulk of the acetone is evaporated is maintained at 42–45° C.

Example 2

The process is carried out as in Example 1 except that the powder used is made by grinding acetone-soluble cellulose acetate which has previously been plasticised with 20% diethyl phthalate on its own weight so that it passes through a gauze of 20 meshes per linear inch but is retained on a gauze of 30 meshes per linear inch. The temperature of the drying cabinet is maintained between 30 and 60° C. according to the size of the bubbles required in the product, smaller bubbles being produced at low than at high temperatures.

Films and foils showing fancy effects can be made according to the invention by employing as the film-forming surface for one layer of the film-forming composition, the surface of a wholly or partially dried layer of said composition supported on the film-forming band and formed during a previous revolution of said band. The powder can be deposited either on the lower layer or layers of composition only or on said layer or layers as well as on the film-forming band.

The invention includes the production of coloured bubble effects. A convenient method of effecting this is to employ a coloured powder. The powder may itself be a colouring agent, for example an organic dyestuff or even an inorganic pigment, or may be a natural white or colourless substance to which the colour has been imparted by treatment, say with a spirit-soluble dyestuff. Again, valuable effects may be produced by employing a metallic powder, for example finely divided bronze or aluminium. Again, colouring agents or effect materials may be contained within the film-forming composition itself. The application of the powder to the material may be substantially uniform, or may be local. By local application of the powder, pleasing pattern effects may be produced. The supporting surface may be suitably treated to retain the grains in position prior to and during formation of the film or the like.

Although cellulose acetate is the most important of the base materials which may be employed in carrying out the invention many other suitable base materials are available. A large number of such materials belong to the class of organo-phyllic colloids, among which particular mention may be made of other organic derivatives of cellulose, nitrocellulose and of polymerized vinyl compounds, for example the polymerized vinly acetates. The base material may also comprise natural and/or synthetic resins such, for example, as are referred to above. In fact any substance or mixture of substances capable of forming filaments, films or coatings and of dissolving in suitable volatile solvents may be employed.

Having described our invention what we desire to secure by Letters Patent is:

1. Process for the production of fancy films, foils, coatings and like products, which comprises applying to a film-forming surface travelling along a closed path through a heated atmosphere a powder, and at a later point in the path of the surface applying thereto a film-forming composition containing the film-forming base dissolved in a volatile solvent, and evaporating the volatile solvent at a temperature sufficiently high to form bubbles in said film-forming composition, the particles of the powder forming nuclei for said bubbles.

2. Process for the production of fancy films, foils, coatings and like products, which comprises applying to a film-forming surface travelling along a closed path through a heated atmosphere a powder, and at a later point in the path of the surface applying thereto a film-forming composition containing the film-forming base dissolved in a volatile solvent, and evaporating the volatile solvent at a temperature sufficiently high to form bubbles in said film-forming composition, the particles of the powder forming nuclei for said bubbles, the powder being one which is compatible with the film-forming base.

3. Process for the production of fancy films, foils, coatings and like products, which comprises applying to a film-forming surface travelling along a closed path through a heated atmosphere a powder, and at a later point in the path of the surface applying thereto a film-forming composition containing the film-forming base dissolved in a volatile solvent, and evaporating the volatile solvent at a temperature sufficiently high to form bubbles in said film-forming composition, the particles of the powder forming nuclei for said bubbles, the powder being of the same composition as the film-forming base.

4. Process for the production of fancy films, foils, coatings and like products, which comprises applying to a film-forming surface travelling along a closed path through a heated atmosphere a porous powder, and at a later point in the path of the surface applying thereto a film-forming composition containing the film-forming base dissolved in a volatile solvent, and evaporating the volatile solvent at a temperature sufficiently high to form bubbles in said film-forming composition, the particles of the powder forming nuclei for said bubbles.

5. Process for the production of fancy films, foils, coatings and like products, which comprises forming on an endless film-forming surface a film by application of a solution in a volatile solvent of a film-forming base and evaporating said solvent, and applying to the film so formed a powder and upon the powder applying a second layer of film-forming composition and evaporating the volatile solvent therefrom at a temperature sufficiently high to cause the formation in the film-forming composition of numerous small bubbles, the particles of the powder forming nuclei for said bubbles.

6. Process for the production of fancy films, foils, coatings and like products, which comprises distributing across the width of an endless film-forming surface a powder suspended in an air stream, and later in the path of travel of said film-forming surface applying thereto a film-forming composition containing a film-forming base dissolved in a volatile solvent and evaporating said volatile solvent at a temperature sufficiently high to cause the formation in said composition of numerous small bubbles, the particles of powder forming nuclei for said bubbles.

7. Process for the formation of fancy films, foils and like products which comprises extruding a solution of cellulose acetate in a volatile solvent on to an endless travelling band at one point in the travel of said band, effecting evaporation of said solvent from the extruded composition during the travel of the band between said point and a further point at which the product is stripped from the band at a temperature sufficiently high to effect the formation of numerous small bubbles in the product during said evaporation, and depositing powdered cellulose acetate on the band from an air stream, at an earlier point in the path of the band than the extrusion point, the powder providing nuclei for the bubble formation.

8. Process according to claim 7, wherein the cellulose acetate is plasticised with diethyl phthalate.

9. Apparatus for the production of fancy films, foils, coatings and like products, comprising a film-forming band, an extrusion device for extruding the film-forming solution on to the film-forming band, means for suspending a powder in an air stream and for directing said air stream on to the film-forming band at a point earlier in the path of the film-forming band than the extrusion orifice for the film-forming solution.

10. Apparatus for the production of fancy films, foils, coatings and like products, comprising a film-forming band, an extrusion device for extruding the film-forming solution on to the film-forming band, means for supplying powder to the film-forming band comprising a fan or blower having an outlet duct ending in a cowl extending across the film-forming band, a container for the powder, and means adapted to be driven from the drive for the fan for delivering measured quantities of the powder from the container to said outlet duct so that the powder is carried by the air stream from the fan on to the film-forming band at a point earlier in the travel of said band than the extrusion device.

JAMES HENRY ROONEY.
PHILIP RICHARD HAWTIN.